3,278,387
FUEL RECYCLE SYSTEM IN A MOLTEN
SALT REACTOR
Leonard E. McNeese and Charles D. Scott, both of Oak Ridge, Tenn., assignors to the United States of America as represented by the United States Atomic Energy Commission
Filed Nov. 29, 1965, Ser. No. 510,466
3 Claims. (Cl. 176—37)

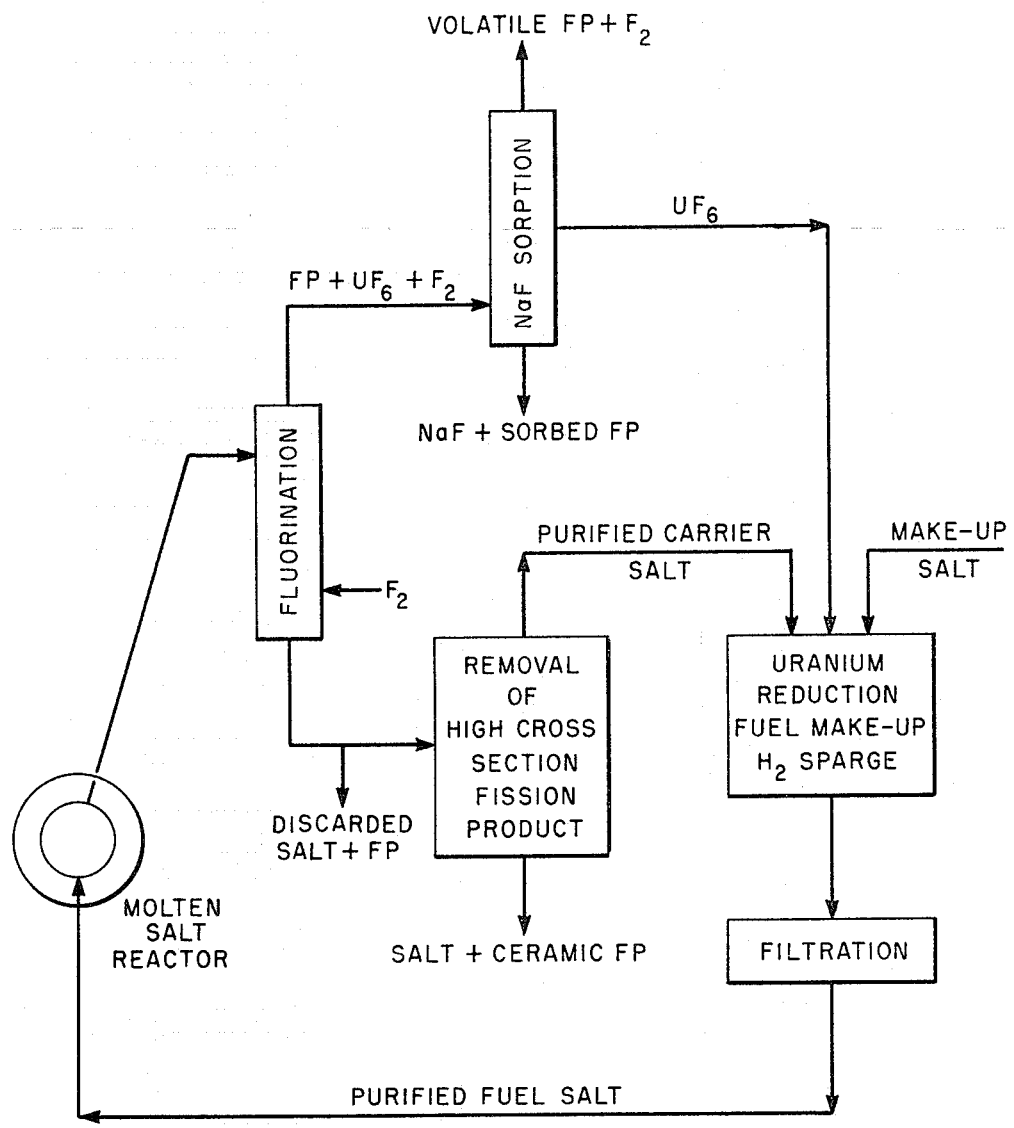

The invention described herein was made in the course of, or under, a contract with the U.S. Atomic Energy Commission.

This invention relates generally to reactor fuel reprocessing methods and more particularly to a method for continuously reprocessing spent molten salt reactor fuels.

Fused salt mixtures as fuels in homogeneous reactors have been demonstrated and found to be especially attractive owing to the high melting temperature of the fuel, low vapor pressure, and excellent stability under neutron irradiation. These salt mixtures have found utility as fuels in thermal or fast reactors which may be employed for power and/or breeder purposes, depending upon the selection of fuel composition and make-up. While the use of fluid fuels affords an opportunity for continuously removing fission products and replacing fissile isotopes at power, processes hereinbefore employed generally operated batchwise or on a semi-continuous basis, and utilized the well known volatility process for removing fuel values such as uranium along with certain volatile fission product fluorides from the salt fuel.

Previously, the remaining carrier salt which contained the high cross section fission products was discarded and the volatilized uranium hexafluoride was reduced to a fine powder form of uranium tetrafluoride for recycle to the purified molten salt fuel. The usual method for effecting such a reduction was by feeding the uranium hexafluoride and hydrogen into a hydrogen-fluorine flame, thereby reducing the uranium hexafluoride to dry uranium tetrafluoride powder. These methods, while they offer limited improvements, require handling of radioactive-contaminated fine powder in any subsequent fuel make-up operation and are costly inasmuch as a portion of the molten salt mixture is discarded after removal of the fuel values. In addition, these methods are not amenable to continuous operations nor have they been found to be capable of meeting the strict requirements of remote operations.

With these difficulties in mind, it is a general object of this invention to provide a method for continuously reprocessing spent molten salt fuels.

Another object is to provide a continuous molten salt reprocessing method wherein valuable fuel values are purified and reconstituted into barren salt fuel without the solids handling and fuel make-up problems attendant with prior art processes.

Still another object is to provide a continuous molten salt reprocessing method wherein fuel values are reconstituted into purified fuel salt in a molten salt environment.

A further object is to provide an improved method for processing fuel and fertile streams of a molten salt breeder reactor.

Other objects will be apparent to those skilled in the art as the description proceeds.

It has been found that uranium hexafluoride, which may for example comprise purified product from a fuel reprocessing volatility process, can be reconstituted into barren molten salt fuel, which contains a quantity of uranium tetrafluoride, by sorbing the uranium hexafluoride in said salt fuel and reducing the uranium hexafluoride to the tetravalent state by hydrogen reduction. The present invention accordingly comprises in its broadest aspects a continuous method for reprocessing spent molten salt fuels wherein a portion of the salt fuel is withdrawn from the reactor core, purified by volatility techniques, and thereafter the volatile fuel values are reconstituted in barren salt and recycled to the reactor core. The present process may conveniently be made integral to a molten salt reactor system and where, for example, a 1000-mw.(e) molten salt breeder reactor is employed, approximately 11.5 ft.$^3$ salt/day can be processed with a fuel salt cycle time of approximately 50 days.

The invention will be more fully understood from the following description considered in connection with the drawing which is a flow diagram of a continuous reprocessing system for spent molten salt fuels.

Referring to the drawing, a side stream of carrier salt is withdrawn from the reactor core and first passed into a fluorinator. There the spent salt is contacted with fluorine gas at a temperature within the range of from 500° to 700° C. for removal of uranium values (present as uranium tetrafluoride) as volatile uranium hexafluoride along with certain volatile fission product fluorides such as $TeF_5$, $MoF_6$, $TeF_6$, $IF_7$, and $RuF_6$. The off-gas from the fluorinator is cooled down and passed through a sodium fluoride bed to sorb the fission products and uranium hexafluoride thereon. By heating the sodium fluoride bed to about 400° C., the uranium hexafluoride which is reversibly absorbed in the bed is removed and completely decontaminated from the fission products which are irreversibly absorbed in the sodium fluoride bed.

It will be apparent that operations of this type at elevated temperatures are quite corrosive and the fluorinator vessel should be constructed of a structural material which has good corrosion resistance to such salts. On a plant-scale operation nickel-base alloys, such as INOR–8, are suitable. A recent development by R. W. Kessie et al. (see ANL–6377 for a more complete description) proposes the use of a frozen-wall technique for reducing corrosion rates in such fluorination operations. There the molten salt fuel is passed into the fluorinator vessel, which has cooling coils disposed about its outer periphery, and allowed to form a frozen layer of salt on the wall of the vessel, thereby protecting the vessel walls from the corrosive attack of the salt. By this arrangement a continuous fluorination of the spent molten salt by countercurrent contact with the fluorine gas may be utilized with the heat generated by the fission products being employed to maintain the bulk of the spent salt in a molten state. For a reference 1000-mw.(e) reactor the fuel stream cooled for 1.5 days will have a specific heat generation rate of $3 \times 10^4$ B.t.u. hr.$^{-1}$ ft.$^{-3}$ which will give an adequate heat flux to support a frozen layer on a cooled wall.

After the uranium hexafluoride is purified and decontaminated from the fission products it is passed to a hydrogen-molten salt reductor. There, in accordance with applicants' discovery, the uranium hexafluoride is absorbed in salt containing uranium tetrafluoride and reduced by hydrogen to the tetravalent state, thus reconstituting the uranium hexafluoride in the salt. The operation of the reductor is carried out by feeding purified carrier salt and needed make-up salt and uranium hexafluoride into the lower section of the reductor while feeding hydrogen gas into the middle section of the reductor.

While applicants do not wish to be bound by any rigid theory, it is thought that the uranium hexafluoride is absorbed by reaction with the uranium tetrafluoride and forms an equivalent intermediate fluoride of uranium, such as $UF_5$, in the carrier salt:

$$UF_{4(salt)} + UF_6 \rightarrow 2UF_{5(salt)}$$

This behavior is indicated by the fact that quantities of fluorine gas sufficient for the formation of $UF_5$ can be absorbed by the carrier salt containing uranium tetrafluoride without the evolution of uranium hexafluoride. Upon absorption this intermediate fluoride will then be reduced to uranium tetrafluoride in the carrier salt by reaction with hydrogen:

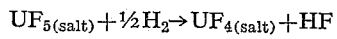

$$UF_{5(salt)} + \tfrac{1}{2}H_2 \rightarrow UF_{4(salt)} + HF$$

The column off-gas contains a mixture of hydrogen and HF, and a side stream of the overhead molten salt may be returned to the reactor core. A portion of the salt containing uranium tetrafluoride, such as, for example, 1 weight percent uranium tetrafluoride, is recycled from the top of the reductor to the bottom where it mixes with the purified carrier salt in order to provide the $UF_4$ needed for reacting with $UF_6$. Prior to passage back into the reactor core the reconstituted molten salt fuel is preferably filtered.

Where, for example, a close-coupled continuous method for reprocessing spent molten salt fuel is desired, the purified carrier salt can be supplied by removal of certain high cross section fission products from the effluent salt from the fluorinator. One method, for example, for removing the high cross section fission products comprises passing the salt through a column containing a low neutron poison rare earth fluoride (see ORNL–2747 for a more complete description). On the other hand, the effluent salt from the fluorinator may be discarded to waste burial and the purified carrier salt supplied by fresh make-up salt.

The molten salt fuels which can be reprocessed by this method may vary over a wide selection. Where, for example, a molten salt thermal reactor is employed, the salt fuel may comprise a mixture of $^7LiF$, $BeF_2$, and $UF_4$. On the other hand, where a molten salt breeder reactor is used, the blanket salt may comprise $^7LiF$ and $ThF_4$. Other typical salt fuels which may be reprocessed are mixtures containing alkali fluorides and fuel values.

Having thus described the present invention in a general fashion, the following examples are provided to illustrate the quantitative aspects and procedures in greater detail. Example I demonstrates the feasibility of reducing $UF_6$ and $UF_4$ by hydrogen in a molten salt environment, and Example II illustrates a continuous method for reprocessing spent molten salt fuels from a molten salt breeder reactor.

Example I

The feasibility of reducing uranium hexafluoride in a molten salt containing uranium tetrafluoride by contacting the molten salt with hydrogen was established as follows: The reactions were carried out in a vessel constructed from 4-in.-diameter schedule-40 nickel pipe 26 inches in length. A ⅜-in. nickel inlet line was located in the center of the vessel and terminated ¼ inch from the bottom of the vessel. A ¾-in. fitting on the top flange allowed the insertion of a cold ⅜-in. nickel rod which was used for sampling the salt. The vessel was heated by two Nichrome-wire resistance furnaces. Sources of $UF_6$ and hydrogen were separately metered and connected to the reaction vessel and a NaF trap disposed downstream from the vessel. A nitrogen purge system was employed with a by-pass around the vessel.

A salt charge consisting of 5320 grams $ZrF_4$, 863 grams LiF, and 61.8 grams $UF_4$ was placed in the reduction vessel and heated to 600° C. The salt mixture had a $UF_4$ concentration of 1 weight percent and a melting point of about 510° C. A $UF_6$ flow of 1.5 grams/minute was fed through the by-pass around the reduction vessel for 16 minutes in order to free the system of nitrogen. The $UF_6$ flow was then diverted into the dip line of the reduction vessel and was continued for 25 minutes. The $UF_6$ flow was stopped and the system purged with nitrogen for 5 minutes after which a salt sample was taken. The quantity of $UF_6$ fed to the system during this step was 38.2 grams (0.108 g.-mole).

The salt was then purged with hydrogen at the rate of 95 st. cm.$^3$/min. for 25 minutes. A total of 0.107 g./mole hydrogen was added during this step. After the system was purged with nitrogen for 10 minutes, a salt sample was taken. The system was then allowed to cool down overnight.

The following day the system was heated to 600° C. and a salt sample taken. The salt was then sparged with hydrogen at a rate of 85 st. cm.$^3$/min. for 20 minutes during which time a total of 0.076 g.-mole hydrogen was fed to the system. The system was then purged with nitrogen for 10 minutes and a salt sample taken to conclude the test. The results are shown in the table below.

TABLE
[Analysis of salt during uranium reduction]

| Salt Sample Source | Wt. percent | | | P.p.m. | |
|---|---|---|---|---|---|
| | U | $U^{+4}$ | $U^{+6}$ | Ni | $O_2$ |
| Initial salt melt | 0.666 | | | 874 | 4,045 |
| After $UF_6$ | 1.05 | 0.954 | <0.01 | 933 | 4,695 |
| After first $H_2$ sparge | 1.01 | 1.074 | <0.01 | 1,002 | 4,940 |
| After overnight cooling and remelting | 1.07 | 0.990 | <0.01 | 1,007 | 3,060 |
| After second $H_2$ sparge | 1.14 | 0.922 | <0.01 | 862 | 3,245 |

From the foregoing table it may be seen that the uranium concentration in the initial salt was found by analysis to be 0.666 wt. percent which is 11.2% lower than the calculated uranium concentration of 0.75 wt. percent. The calculated uranium concentration for complete absorption of the $UF_6$ bubbled through the salt was 1.15 wt. percent. The uranium concentration after the $UF_6$ addition was found by analysis to be 1.07 wt. percent, which is deemed to be, within the accuracy of the experimental data, complete absorption of the $UF_6$ in the salt melt. While the $U^{+4}$ concentration was found to be different after the first and second hydrogen sparge, these are differences that are within the limits of analytical error and are not meaningful.

Two further tests were made using the same equipment and techniques with the exception that the off-gas from the reductor during the period of $UF_6$ addition to the salt was passed through a NaF bed for removal of unabsorbed $UF_6$. Examination of the NaF trap showed no $UF_6$, which indicated complete absorption of $UF_6$ in the salt.

Example II

A continuous method for reprocessing spent molten salt fuels from a 1000-mw.(e) molten salt breeder reactor is operated as follows: Approximately 11.5 ft.$^3$/day of salt is removed from the reactor core by a side stream and is passed into a fluorination tower (3″ I.D. x 10′) constructed of INOR–8. There the molten salt which is maintained at a temperature near its melting point (~550° C.) is passed downflow at a rate of 217 cc./min. and contacted with fluorine gas countercurrently at a flow rate of 3700 cc./min. The off-gas product containing volatilized $UF_6$ and volatile fission product fluorides is passed through a two-zone sodium fluoride sorption bed where the first zone at 400° C. removes some of the volatile fission products and a second zone at 150° C. removes the $UF_6$ and some of the more volatile fission product fluorides.

The $UF_6$ is removed from the sodium fluoride bed by heating it to a temperature of 400° C. and it then passes through a magnesium fluoride sorption bed where the remaining fission products are removed. The purified $UF_6$ is fed into the hydrogen-molten salt reducer at a rate of 18.7 g./min. where it is passed upflow with 434 cc./min. of molten salt containing 1.35 wt. percent $UF_4$ which is a combination of 217 cc. of barren salt and 217 cc. of recycle salt containing 2.7 wt. percent $UF_4$. The sorbed $UF_6$ and molten salt are contacted upflow with 1200 cc./min. H$_2$ which completely reduces the sorbed UF$_6$ to UF$_4$ and the reconstituted molten salt is taken off from the top of the reductor, filtered, and passed at a flow rate of 11.5 ft.$^3$/day back into the reactor core. Molten salt stream is also taken from the top of the reductor and recycled at the flow rate of 11.5 ft.$^3$/day to the bottom of the reductor where it is combined with additional barren salt and contacted with purified UF$_6$.

By this method a 1000-mw.(e) molten salt breeder reactor which has a total core molten salt content of about 670 ft.$^3$ can be reprocessed with a fuel cycle time of approximately 58 days.

What is claimed is:

1. A method for continuously reprocessing spent molten salt reactor fuels comprising the steps of:
    (a) removing a portion of said molten salt from the reactor core to a fluorination reactor;
    (b) causing volatilization of uranium and volatile fission product fluorides by direct fluorination of said molten salt;
    (c) separating volatile uranium hexafluoride from volatile fission product fluorides by selective sorption-desorption on a bed of sodium fluoride;
    (d) further decontaminating the uranium-depleted molten carrier salt remaining in the fluorinator reactor from high cross section fission products to provide purified carrier salt;
    (e) recombining said purified uranium hexafluoride with said purified carrier salt containing a portion of uranium tetrafluoride along with make-up salt by sorbing said uranium hexafluoride in said salt mixture and contacting same with hydrogen to thereby reduce said uranium hexafluoride to uranium tetrafluoride in said molten salt; and
    (f) thereafter returning a portion of said reconstituted carrier salt to the reactor core.

2. The method of claim 1 wherein said uranium hexafluoride reduction to uranium tetrafluoride comprises:
    (a) feeding UF$_6$ and salt containing uranium tetrafluoride along with purified carrier salt into the lower region of said reductor;
    (b) feeding hydrogen gas into the intermediate region of said reductor;
    (c) removing hydrogen fluoride and hydrogen from the upper region;
    (d) removing from the top and recycling to the bottom of said reductor a portion of the reconstituted carrier salt; and
    (e) maintaining the relative flows to provide complete reduction of said uranium hexafluoride to uranium tetrafluoride in the upper region of said reductor.

3. The method of claim 1 wherein said spent molten salt reactor fuel comprises $^7$LiF–BeF$_2$–UF$_4$.

References Cited by the Examiner

Chemical Engineering Progress Symposium Series, No. 20, 1957, vol. 53, Liquid Metals Technology, pp. 29–30.

Nuclear Science and Engineering, vol. 2, 1957, pp. 797–803, Molten Fluorides as Power Reactor Fuels.

Proceedings of the Second U.N. International Conference, 1958, vol. 17, pp. 465–466, 473–474.

L. DEWAYNE RUTLEDGE, *Primary Examiner.*

H. E. BEHREND, *Assistant Examiner.*